Figure 1:
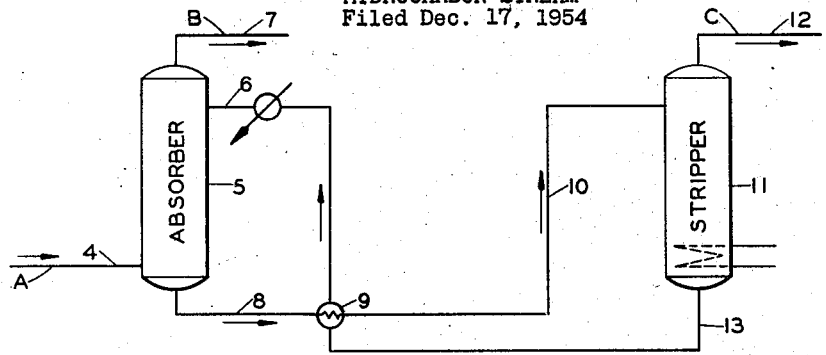

Nov. 11, 1958   W. A. GOLDTRAP ET AL   2,860,030
RECOVERY OF HYDROGEN SULFIDE AND/OR CARBON DIOXIDE
SUBSTANTIALLY FREE FROM HYDROCARBONS AND
SUBSTANTIALLY PURE HYDROCARBONS BY
CHEMICAL TREATMENT OF AN IMPURE
HYDROCARBON STREAM
Filed Dec. 17, 1954

INVENTORS
W. A. GOLDTRAP
BRADLEY SKINNER
BY
Hudson Young
ATTORNEYS

United States Patent Office 2,860,030
Patented Nov. 11, 1958

2,860,030

RECOVERY OF HYDROGEN SULFIDE AND/OR CARBON DIOXIDE SUBSTANTIALLY FREE FROM HYDROCARBONS AND SUBSTANTIALLY PURE HYDROCARBONS BY CHEMICAL TREATMENT OF AN IMPURE HYDROCARBON STREAM

Walter A. Goldtrap and Bradley Skinner, Bartlesville, Okla., assignors to Phillips Petroleum Company, a corporation of Delaware Application December 17, 1954, Serial No. 475,962

19 Claims. (Cl. 23—3)

This invention relates to a modus operandi for the chemical treatment of a gas stream containing either hydrogen sulfide or carbon dioxide, or both.

In one of its aspects the invention relates to subjecting a rich absorbent stream resulting from the chemical absorption of hydrogen sulfide and/or carbon dioxide from a hydrocarbon stream containing the same to an intermediate flashing step to release the less-soluble component from said stream and then later recovering from said absorbent the remaining absorbed component. In a more specific aspect the invention relates to absorbing hydrogen sulfide from a hydrocarbon gas stream containing the same, employing a suitable solvent, flashing rich absorbent thus obtained to remove any absorbed hydrocarbon therefrom, scrubbing the flashed hydrocarbons to remove any entrained hydrogen sulfide therefrom, combining the medium used to scrub the flashed hydrocarbons with absorbent used to contact the original sour gas stream and subjecting the flashed rich absorbent to stripping to recover substantially hydrocarbon-free hydrogen sulfide therefrom and lean absorbent for reuse, as described.

It is an object of this invention to recover from a sour gas stream, that is a gas stream containing hydrogen sulfide and/or carbon dioxide and another gas, hydrogen sulfide and/or carbon dioxide substantially free from said other gas. It is another object of this invention to recover from said sour gas, said other gas substantially free from hydrogen sulfide or carbon dioxide. It is a further object of this invention to increase the quantity of hydrocarbon yielded from an operation in which hydrogen sulfide and/or carbon dioxide are removed from said hydrocarbon.

Other aspects, as well as objects, of this invention are apparent from this description, the drawing and the claims.

The invention will be described with reference to a hydrocarbon gas stream containing hydrogen sulfide, but it will be understood that where hydrogen sulfide is mentioned, the non-hydrocarbon component can comprise either hydrogen sulfide or carbon dioxide, or both.

Figure 2:
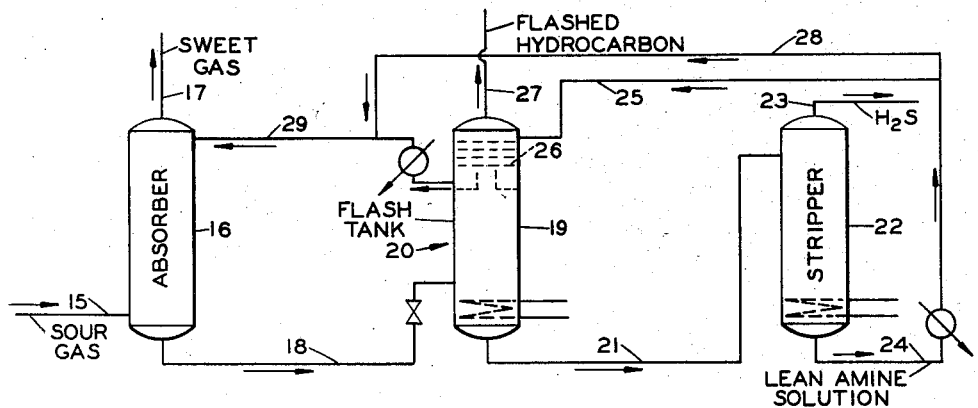
Figure 3:
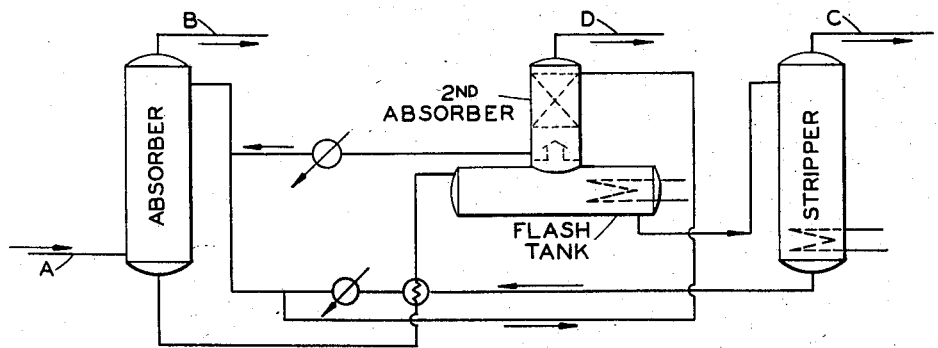

Figure 1 is a diagrammatic showing of a conventional operation in which a hydrocarbon gas stream containing hydrogen sulfide is contacted with an absorbent to remove hydrogen sulfide from said hydrocarbon. Stripping of the rich absorbent to remove hydrogen sufide therefrom and reuse of the absorbent are illustrated. Figure 2 is a simplified diagrammatic flow plan of a modus operandi according to the present invention. The figure shows the flashing of the rich absorbent, as described, and the scrubbing of the vapors which result from said flashing with lean absorbent and the admixing of the lean absorbent after it has been used to scrub the flashed vapors with the absorbent used to scrub the original gas stream. Figure 3, later herein compared with Figure 1, shows a preferred flow plan of an embodiment according to the invention. In this embodiment the lean absorbent is heat exchanged with the bottoms of the absorber before said bottoms are passed to the flashing zone. The cooled lean absorbent is then split into two streams, one of which is passed to the absorber and the other of which is used to scrub flashed vapors in a second absorber which, in the embodiment, is located within the flashing apparatus.

According to this invention there is provided a modus operandi for the recovery of hydrogen sulfide, by chemical means, from a gas, for example a hydrocarbon gas stream, containing the same, which comprising contacting said stream with an absorbent under absorbing conditions to remove substantially all hydrogen sulfide therefrom, recovering a first substantially hydrogen-sulfide-free gas stream, flashing rich absorbent containing hydrogen sulfide and a portion of the gas from which it has been removed to recover therefrom said portion of gas substantially completely, thus forming flashed vapors containing traces of hydrogen sulfide, contacting said flashed vapors with lean absorbent to recover said traces of hydrogen sulfide therefrom, recovering said additional portion of gas from which hydrogen sulfide has been substantially completely separated or removed as another product of the process, stripping the flashed rich absorbent to recover therefrom hydrogen sulfide substantially free from any portion of the gas from which the hydrogen sulfide has been removed, and solvent substantially free from hydrogen sulfide and said gas from which it has been removed. Further, according to the invention, the lean absorbent which has been used to absorb from the flashed vapors the traces of hydrogen sulfide contained therein is combined with the lean absorbent being passed to the absorber zone.

Referring now to Figure 1 of the drawing, a sour hydrocarbon gas is fed by way of conduit 4 into the bottom of absorber 5 wherein it is contacted with lean absorbent fed thereto by way of conduit 6. Overhead from the absorber is hydrocarbon substantially free of hydrogen sulfide. This overhead is removed from the process by way of conduit 7. Rich absorbent is removed from absorber 5, by way of conduit 8, heat interchanged in heat exchanger 9 with hot lean absorbent and passed by way of conduit 10 into stripper 11, wherein there are recovered overhead hydrogen sulfide and a portion of the original hydrocarbon. This overhead is removed from the process as a product thereof by way of conduit 12. Stripper bottoms consisting mainly of solvent substantially free of hydrocarbons and of hydrogen sulfide are passed by way of conduit 13; heat interchanged in heat exchanger 9 with rich absorbent and passed by way of conduit 6 into absorber 5. It will be noted that in this operation a portion of the original hydrocarbon stream is removed overhead by way of conduit 12 from stripper 11 and is lost from the system.

Referring now to Figure 2, which shows an embodiment of the invention, as stated, sour gas is passed by way of conduit 15 into absorber 16. In absorber 16 all of the hydrogen sulfide is removed from the sour gas yielding a sweet gas which is removed by way of conduit 17. Rich absorbent is removed from the bottom of absorber 16 by way of conduit 18 and passed into flashing zone 19 located in vessel 20. Zone 19 is operated at a pressure which is substantially lower than that prevailing in absorber 16. In zone 19 the rich absorbent, which contains all of the hydrogen sulfide from the original gas stream and a portion of the hydrocarbons contained therein, is flashed yielding vapors containing substantially all of the hydrocarbons in the rich absorbent stream and a portion of the hydrogen sulfide of said stream. The flashed absorbent is removed from zone 19 by way of conduit 21 and passed into stripper 22. In stripper 22 hydrogen sulfide is stripped from the absorbent and recovered substantially free of any hydrocarbon. The hydrogen sulfide is removed as a product of the process by way of conduit 23. Lean absorbent is removed from stripper 22 by way of conduit 24 and passed in part by way of conduit 25 into scrubbing section 26 of tower 20. In scrubbing section 26 the lean absorbent removes a small amount of hydrogen sulfide contained in the flashed hydrocarbon vapors passing upwardly from flash zone 19 and out from the system as a product of the process by way of conduit 27. Lean absorbent thus used is combined with the remainder of the lean absorbent which is passed by way of conduit 28 into conduit 29 for use in absorber 16, as described. It will be noted that, according to the invention, there is obtained a flashed hydrocarbon overhead by way of conduit 27 which is free of hydrogen sulfide. Further, there is obtained, according to the invention, a hydrogen sulfide overhead by way of conduit 23, which is substantially free from hydrocarbon. Thus, according to the invention, in a unitary operation a sour gas is treated to recover substantially all of the hydrocarbons therein contained, as such, substantially free from hydrogen sulfide, as well as hydrogen sulfide contained therein substantially free from hydrocarbons.

Referring now to Figure 3, it will be noted that this figure differs from the figures heretofore described in that the rich absorbent bottoms after heat interchange with the stripper bottoms or lean absorbent is passed to the kettle of the flashing zone. In Figure 1 the heat exchanged bottoms from the absorber are passed directly to the stripper and in Figure 2 no heat interchange between the stripper bottoms and the absorber bottoms is shown.

The following is a comparison of results which can be obtained according to the conventional operation of Figure 1 and the results which can be obtained according to the operation of the invention which is shown in Figure 3. It will be noted from the tabular data below that the hydrocarbon lost from the system from the top of stripper 11 in the conventional operation is 362,000 whereas the hydrocarbon lost from the top of the stripper in Figure 3 or from the top of stripper 22 of Figure 2 is only 139,000 standard cubic feet per day.

*Standard cubic feet per day*

|  | A | B | C | D |
| --- | --- | --- | --- | --- |
| Fig. 1 Operation: |  |  |  |  |
| H₂S | 762,000 | trace | 762,000 |  |
| CO₂ | 680,000 | trace | 680,000 |  |
| Hydrocarbon | 54,058,000 | 53,696,000 | 362,000 |  |
| Total | 55,500,000 | 53,696,000 | 1,804,000 |  |
| Fig. 3 Operation: |  |  |  |  |
| H₂S | 762,000 | trace | 762,000 | trace |
| Co₂ | 680,000 | trace | 680,000 | trace |
| Hydrocarbon | 54,058,000 | 53,699,000 | 139,000 | 220,000 |
| Total | 55,500,000 | 53,699,000 | 1,581,000 | 220,000 |

The letters A, B, C, and D, which are at the head of the columns in the table above, identify streams similarly labeled in the figures of the drawing.

It will be obvious to one skilled in the art in possession of this disclosure that the feed streams can be widely different and that the modus operandi of the invention can be adapted to the treatment of a great many different streams. Among the absorbents which can be employed according to the invention are diethylene glycol-monoethanolamine, aqueous solutions of monoethanolamine, diethanolamine, or potassium phosphate. At present writing it appears that aqueous amine solutions will show advantages over glycol-amine mixtures when employed according to the claimed invention.

The pressure in the absorber will usually be 100 pounds per square inch gauge or higher and will usually be in the neighborhood of 500–650 pounds per square inch gauge. Higher or lower pressures are within the scope of the claims. The temperature in the absorber will ordinarily be relatively low and will vary depending upon the absorbent used, the degree of purity desired and the composition of the feed stock. For example, when diethylene glycol and monoethanolamine absorbent is employed, the temperature will vary from about 80° F. to about 100° F. at the top of the tower and from about 120° to 130° F. at the tower bottom. It will be obvious to one skilled in the art that the temperature and pressure will be selected for optimum operation. The conditions can be selected by mere routine test. In the flashing zone and second absorber a considerably lower pressure, for example of the order of 10 to about 30 pounds per square inch guage, will be employed although pressures as low as 0 to as high as 100 pounds per square inch guage and indeed even lower or higher are contemplated within the scope of the claims. The now preferred pressure will be that which is sufficiently low to obtain desired results consistent with it being sufficient to permit solution to flow without pumping to the stripper. The temperature in the bottom of the second absorber, when employing diethylene glycol-monoethanolamine absorbent will be generally in the range of from about 100 to about 250° F., although higher or lower temperatures are not excluded from within the scope of the claims. The stripper bottoms will be at about 310° F. when the stripper is operated substantially at atmospheric pressure or thereabouts. Stripper overhead is controlled to be somewhat below about 200° F., for example 190–195° F. Generally, on the subject of conditions of temperature pressure, flow rate, etc., the present invention being for a modus operandi as claimed, the conditions are not in any particular case limiting but are set forth for purposes of complete disclosure.

This invention is especially useful to the preparation of feed for a catalytic recovery of sulfur from hydrogen sulfide wherein hydrogen sulfide is oxidized to sulfur dioxide, at least in part, and then reacted catalytically with hydrogen sulfide according to the equation $$2H_2S + SO_2 \rightarrow 2H_2O + 3S$$

Pumps, valves, etc. have been omitted for sake of simplicity.

The absorbents which are suited to the removal of carbon dioxide are known in the art and, indeed, the absorbents herein set forth are suitable.

Reasonable variation and modification are possible within the scope of the foregoing disclosure, drawing and the appended claims to the invention the essence of which is that there has been provided a modus operandi for chemically removing contaminant gas, such as hydrogen sulfide and/or carbon dioxide from a hydrocarbon gas stream, as described, to simultaneously recover a pure hydrocarbon gas stream uncontaminated by either hydrogen sulfide or carbon dioxide and a stream containing hydrogen sulfide, and carbon dioxide if present, substantially uncontaminated by hydrocarbons.

We claim:

1. A method for recovering at least hydrogen sulfide from a hydrocarbon gas stream contaminating the same which comprises forming an H₂S-rich absorbent by contacting a sufficient amount of a liquid, chemical absorbent which reacts chemically with H₂S to thus absorb the same with said stream under conditions to cause chemical absorption of substantially all of said H₂S from said gas stream thus producing and removing from the operation a substantially H₂S-free hydrocarbon gas product, flashing from said rich absorbent substantially all of the hydrocarbon, unavoidably absorbed by said reagent when said H₂S was absorbed, together with contaminating hydrogen sulfide, stripping the flashed rich absorbent to recover hydrogen sulfide therefrom having a substantially reduced residual hydrocarbon content, and contacting at least a portion of lean absorbent obtained from said stripping with the vapors, obtained upon said flashing of the rich absorbent, to remove the contaminating hydrogen sulfide therefrom producing an additional amount of substantially H₂S-free hydrocarbon gas which is removed from the operation.

2. A method according to claim 1 wherein the lean absorbent after removing said contaminating hydrogen sulfide from the flashed vapors is passed to the contacting of said hydrocarbon gas stream with said absorbent.

3. A method for recovering hydrogen sulfide from a hydrocarbon gas containing the same in minor proportion, substantially free of said hydrocarbon gas which comprises contacting said hydrocarbon gas with a sufficient amount of a liquid chemical reagent adapted to chemically absorb hydrogen sulfide so as to absorb chemically therefrom substantially completely all hydrogen sulfide and a minor proportion of hydrocarbon obtaining a rich reagent and a substantially H₂S-free hydrocarbon gas which is removed from the operation as a product, flashing said reagent so as to obtain therefrom as vapors substantially all of the hydrocarbon which was absorbed in said reagent together with a contaminating amount of hydrogen sulfide, stripping the thus flashed reagent to obtain therefrom substantially hydrocarbon free hydrogen sulfide and lean reagent, and contacting a portion of said lean reagent with said vapors obtained upon flashing said reagent to remove hydrogen sulfide therefrom to obtain an additional proportion of hydrogen sulfide-free hydrocarbon gas which is also removed from the operation as a product, thus increasing total hydrocarbon gas free of hydrogen sulfide, while at the same time obtaining hydrogen sulfide in yield as high as without said flashing step but of hydrocarbon gas content considerably reduced below that which it would have without said flashing step.

4. In the recovery of hydrogen sulfide, suitable for catalytic conversion thereof to sulfur, substantially freed of hydrocarbon gases in which it is contained as a minor constituent, the steps which comprise contacting said hydrocarbon gases with a sufficient amount of a liquid chemically acting reagent adapted to chemically absorb hydrogen sulfide so as to form a hydrogen sulfide rich reagent unavoidably containing a minor proportion of hydrocarbons and a substantially H₂S-free hydrocarbon gas which is removed from the operation as a product, flashing said rich reagent so as to obtain therefrom as vapors substantially completely all the hydrocarbon gases unavoidably absorbed and held therein containing a minor proportion of hydrogen sulfide, stripping said flashed reagent to disengage therefrom the hydrogen sulfide therein, recovering said hydrogen sulfide substantially freed of the hydrocarbon gases which originally contained said hydrogen sulfide and lean reagent and contacting at least a portion of said lean reagent with said vapors obtained upon flashing said hydrogen sulfide rich reagent to recover hydrogen sulfide therefrom absorbed in said reagent and additional substantially H₂S-free hydrocarbon gases which are removed from the operation.

5. A method according to claim 4 wherein the lean reagent after removing hydrogen sulfide from said hydrocarbon vapors is passed to the said contacting of said hydrocarbon gases with a chemically acting reagent.

6. A method for separating a hydrocarbon gas stream containing a small amount of H₂S as an impurity into a hydrocarbon component and a hydrogen sulfide containing component which comprises contacting said mixture in an absorber zone with a sufficient amount of a liquid, chemically-acting reagent adapted to chemically absorb H₂S to substantially selectively absorb substantially all the hydrogen sulfide from said mixture continuing the contacting until all of the hydrogen sulfide in said mixture has been absorbed into the reagent, thus forming a hydrogen sulfide rich reagent stream containing all of the hydrogen sulfide originally in said mixture and some unavoidably accompanying hydrocarbon and a sweet hydrocarbon stream requiring no further purification to remove H₂S therefrom, removing said hydrocarbon stream from the absorber zone as a product of the operation, removing the rich reagent stream from the absorber zone, heating said rich reagent and flashing said reagent so as to obtain therefrom as vapors substantially all of the hydrocarbon contained therein together with a minor proportion of hydrogen sulfide, then recovering as a product the hydrogen sulfide still contained in said flashed reagent by a heating and stripping operation thus obtaining a lean reagent and contacting at least a portion of said lean reagent with said vapors so as to remove therefrom the hydrogen sulfide contained therein, thus forming additional H₂S-free hydrocarbon which is recovered and removed from the operation as a product.

7. A method according to claim 6 wherein the flashing is effected at a pressure lower than the pressure prevailing in the absorber zone.

8. A method according to claim 6 wherein the rich reagent, prior to flashing, is heat exchanged with lean absorbent from the stripping operation.

9. A method according to claim 6 wherein the reagent is a diethylene glycol-monoethanolamine solution.

10. A method according to claim 6 wherein the reagent is one of aqueous monoethanolamine and aqueous diethanolamine.

11. A method according to claim 6 wherein the reagent is an aqueous solution of potassium sulfate.

12. A method for recovering at least carbon dioxide from a hydrocarbon gas stream contaminating the same which comprises forming a $CO_2$-rich absorbent by contacting a sufficient amount of a liquid absorbent which chemically reacts with $CO_2$ with said stream under conditions to cause chemical absorption of said $CO_2$ from said gas stream and unavoidably the absorption of hydrocarbons therefrom, thus producing a $CO_2$-free hydrocarbon product which is removed from the operation, flashing from said rich absorbent substantially all of the hydrocarbon unavoidably absorbed thereby together with contaminating carbon dioxide, stripping the flashed rich absorbent to recover carbon dioxide therefrom having a substantially reduced residual hydrocarbon content, and contacting at least a portion of lean absorbent obtained from said stripping with the vapors, obtained upon said flashing of the rich absorbent, to remove the contaminating carbon dioxide therefrom, thus producing and removing from the operation an additional amount of $CO_2$-free hydrocarbon.

13. A method according to claim 12 wherein the lean absorbent after removing said contaminating carbon dioxide from the flashed vapors is passed to the contacting of said hydrocarbon gas stream with said absorbent.

14. A method for recovering carbon dioxide from a hydrocarbon gas containing the same in minor proportion, substantially free of said hydrocarbon gas which comprises contacting said hydrocarbon gas with a sufficient amount of a liquid reagent which chemically reacts with $CO_2$ to absorb chemically therefrom substantially completely all carbon dioxide and a minor proportion of hydrocarbon obtaining a rich reagent and a $CO_2$-free hydrocarbon product which is removed from the operation, flashing said reagent so as to obtain therefrom as vapors substantially all of the hydrocarbon absorbed thereby together with a contaminating amount of carbon dioxide, stripping the thus flashed reagent to obtain therefrom substantially hydrocarbon-free carbon dioxide and lean reagent, and contacting a portion of said lean reagent with said vapors to remove carbon dioxide therefrom to obtain an additional proportion of carbon dioxide-free hydrocarbon gas, removing said $CO_2$-free gas from the operation, thus increasing total hydrocarbon gas free of carbon dioxide, while at the same time obtaining carbon dioxide in yield as high as without said flashing step but of hydrocarbon gas content considerably reduced below that which it would have without said flashing step.

15. A method for separating into a hydrocarbon component and a carbon dioxide-containing component a mixture containing a hydrocarbon gas and carbon dioxide which comprises contacting said mixture in an absorber zone with a sufficient amount of a liquid, chemically-acting reagent adapted to substantially selectively absorb carbon dioxide from said mixture, continuing the contacting until all of the carbon dioxide in said mixture has been dissolved into the reagent thus forming a carbon dioxide-rich reagent stream containing all of the carbon dioxide originally in said mixture and some unavoidably accompanying hydrocarbon and a substantially $CO_2$-free hydrocarbon stream, removing said last-mentioned hydrocarbon stream from the absorber zone and from the operation as a product, removing the rich reagent stream from the absorber zone, heating said rich reagent and flashing said reagent so as to obtain therefrom as vapors substantially all of the hydrocarbon contained therein together with a minor proportion of carbon dioxide, then recovering as a product the carbon dioxide still contained in said flashed reagent.

16. A method according to claim 15 wherein the flashing is effected at a pressure lower than the pressure prevailing in the absorber zone.

17. A method according to claim 15 wherein the rich reagent, prior to flashing, is heat exchanged with lean absorbent from the stripping operation.

18. A method according to claim 15 wherein the reagent is a solution of an ethanolamine suitable for absorption of carbon dioxide from a gas stream containing the same.

19. A method for removing contaminant gases consisting essentially of carbon dioxide and hydrogen sulfide from a hydrocarbon stream which comprises in an absorber zone contacting said stream with a sufficient amount of a liquid, chemically active reagent adapted to chemically react with and to absorb thus to remove therefrom all of said contaminant gases thereby unavoidably absorbing also some of the hydrocarbon from said hydrocarbon stream obtaining a rich reagent containing all of said contaminant gases and said unavoidably absorbed hydrocarbon and a substantially contaminant-free hydrocarbon stream which is removed from the operation; flashing all of said unavoidably absorbed hydrocarbon from said rich reagent thereby obtaining vapors containing said hydrocarbons which were unavoidably absorbed together with contaminant gases unavoidably released from said reagent; stripping said flashed reagent of its still contained contaminant gases to obtain a lean reagent and contacting at least a portion of said lean reagent with said vapors containing hydrocarbons which were unavoidably absorbed to remove therefrom the unavoidably released contaminant gases; and recovering hydrocarbons free from contaminant gases as a further product of the method and contaminant gases substantially free from hydrocarbons as another product of the method.

References Cited in the file of this patent

UNITED STATES PATENTS

| | | |
|---|---|---|
| 1,971,798 | Shoeld | Aug. 28, 1934 |
| 2,242,323 | Powell | May 10, 1941 |
| 2,477,314 | Scharmann | July 26, 1949 |